United States Patent Office 2,887,391
Patented May 19, 1959

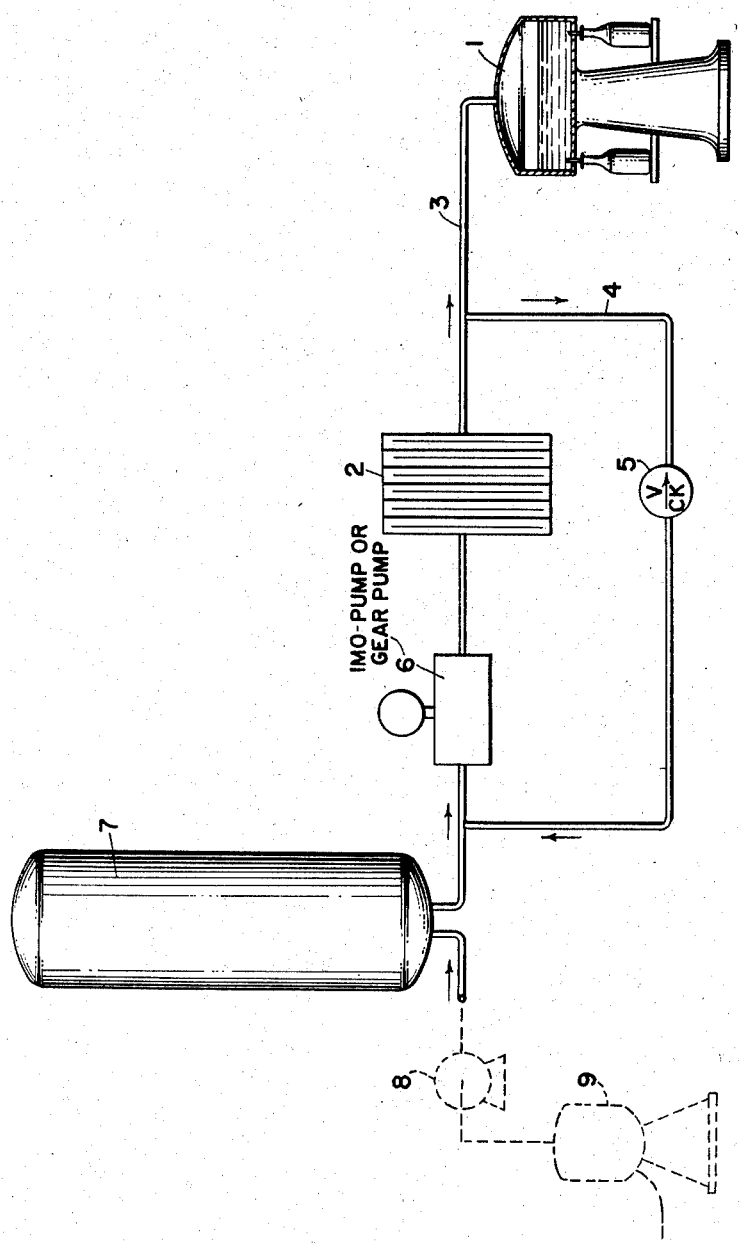
INVENTORS
JACOB BALTZAR JACOBSSON
AND NILS AKE ELSNER
ATTORNEYS

2,887,391

METHOD FOR THE PRODUCTION OF PASTEURIZED BEVERAGES, AND CONTRIVANCE FOR UTILIZING THIS METHOD

Jacob Baltzar Jacobsson and Nils Åke Elsner, Hagersten, Sweden

Application February 23, 1956, Serial No. 567,386

6 Claims. (Cl. 99—211)

The present invention refers to a method for bulk-pasteurization in connection with the bottling of beverages, e.g. malt beverages or milk, and represents more especially a method for regulating the amount of liquid being conveyed to the bottle-filling machine so as to adjust it to the variations in the receiving capacity of the bottle-filling machine, and in connection therewith a method for regulating the pressure in the bottle-filling machine. The invention comprises also contrivances for utilizing the method.

Pasteurization in bottles was probably the first method employed for the pasteurization of e.g. beer. This method is still in use. In later years so-called bulk-pasteurization has also been employed, in which a so-called flat pasteurizer may be used. Another way for freeing the beer from injurious microorganisms is sterile-filtering. This is a method which has been used especially in connection with the so-called sterile bottling of beer. In this case the beer goes directly from the sterile filter to the bottle-filling machine. This method may be used without difficulty because the filter functions satisfactorily even in the case of occasional interruptions in the filling process. But it has so far not been possible to combine the flat pasteurizer for beer with the bottling of beer. This is due to the fact that the beer is not flowing evenly during the bottle-filling operation. As is well known, interruptions or break-downs occur occasionally. This means that the flow of liquid varies in the pasteurizer, thereby naturally causing trouble or disturbance in the heat balance of the pasteurizer. One of the conditions for efficient operation of the pasteurizer is heating the liquid to a certain temperature, at which it must be kept for a definite time. For this reason one has so far been compelled to insert a container between the pasteurizer and the filling machine, in which the entire amount of pasteurized beer is collected. Subsequently the beer has been pumped or forced from this container to the bottle-filling machine. This procedure is technically easy to perform. The pasteurizing effect is, however, eliminated by the fact that this container cannot be kept free from infection. This means that the principle of the flat pasteurizer cannot be fully utilized for the sterile bottling of beer.

It is the purpose of the present invention to eliminate these drawbacks. According to the invention the problem can be solved with a shunt line connected ahead of and behind the pasteurizer, and an overflow valve placed in the latter which permits an even flow of liquid through the pasteurizer even in case of interruptions of variations in the bottling operation. This shunt line with its overflow valve must in this case, in order to function properly, be supplemented by a pump in the main line ahead of the pasteurizer, producing a constant flow of liquid at diverse pressures. Such a system may seem simple, but can hardly be utilized at present because, as far as we know, there is no effective overflow valve meeting all the technical and biological requirements.

However, the problem may be solved in a very simple and elegant way, according to the present invention, if instead of an overflow valve a check valve is placed in the shunt line, and in addition a pressure device of some sort connected ahead of the junction of the shunt line with the main line, e.g. a pressure chamber and a pump with constant capacity at various pressures, placed between the pressure chamber and the pasteurizer. Even other pressure and pump arrangements may be utilized, however.

By employing the method made possible with these contrivances for bulk pasteurization in connection with the bottling of beverages, still another method is rendered feasible, characterized by the possibility of regulating the pressure at the bottle-filling machine in a simple and biologically entirely satisfactory way by means of the pressure prevailing in the pressure chamber of other corresponding devices.

This method permits also continuous operation in a wider sense, e.g. in a brewery where the storage tank via a separator or a filter and pump may be connected directly to the aforesaid pressure tank. This arrangement permits drawing the beer from the storage tank and separating (filtering), pasteurizing and tapping it continuously and successively on its way to the retail container (bottle). Thus it is possible to regulate the whole process from a single place, irrespective of possible interruptions in the bottling process.

The contrivances required for utilizing the method, according to one embodiment of the invention, are visualized in the attached drawing.

In this drawing 1 signifies a bottle-filling machine, 2 a pasteurizer, 3 the main line for the beverage concerned, 4 a shunt line connected ahead of and behind the pasteurizer, equipped with a valve 5 permitting flow in one direction only (check valve) and a pump with constant capacity at varying pressure. 7 signifies a pressure chamber, 8 a pump and 9 a separator. The functioning of the system ought to be clear from the figure. By regulating the pressure in the pressure chamber 7 the pressure in the bottle-filling machine 1 may be adjusted to desired height, the pressure in the latter being directly dependent on the former pressure.

Pasteurization and bottling is effected in the following way. The heat for the pasteurizer 2 is turned on and the temperature set at the desired level. The pump 6 (Imo-pump or gear pump delivering a constant volume of liquid at varying pressure) is started, forcing the liquid into the bottle-filling machine 1. The pump 6 is so dimensioned that its capacity is somewhat larger than that of the bottle-filling machine 1. In this way there will always be a minor quantity of liquid circulating through the shunt line 4 during pasteurization.

Under constant conditions without interruptions in operation there will always be a certain quantity—perhaps 22 hectoliters of beer—flowing through the pasteurizer 2. Of this quantity 20 hectoliters will go to the bottle-filling machine 1 when working at full speed, while 2 hectoliters return to the shunt line 5 and pass through the pasteurizer 2 a second time.

In case the bottling process is interrupted for some reason, the quantity circulating in the shunt line 4 will of course vary between 2 and 22 hectoliters. The check valve 5 in the shunt line is turned in such a way that it lets the beer pass only toward the intake side of the pasteurizer. It thus functions as a biological barrier or trap between the pasteurized and the non-pasteurized beer.

We claim:

1. Apparatus for supplying pasteurized beverage to a bottle-filling machine comprising a bulk pasteurizer for heating the beverage therein to a given pasteurizing temperature and having an input and an output, means for supplying beverage from a source to said input at a constant rate in excess of the maximum requirements of the bottle-filling machine, means connected to the output for feeding the pasteurized beverage to the bottle-filling machine at a required variable lower rate, a pipe connecting said output to said input, and an overflow valve interposed in said pipe for returning the remaining variable portion of said beverage to the source, the arrangement being such that there is a constant flow of beverage through said pasteurizer irrespective of the varying requirements of the bottle-filling machine.

2. Apparatus for supplying pasteurized beverage to a bottle-filling machine comprising a bulk pasteurizer for heating the beverage to a given pasteurizing temperature and having an input and an output, a pump connected to said input for feeding beverage from a supply to the pasteurizer at a constant rate irrespective of pressure, said rate being greater than the maximum rate of supply required by the bottle-filling machine, means at the output for feeding the pasteurized beverage to the bottle-filling machine at a required variable lower rate, a pipe connecting said output to the supply, and an overflow valve interposed in said pipe for returning the remaining variable portion of the beverage to the supply, the arrangement being such that there is a constant flow of beverage through said pasteurizer independent of the varying requirements of the bottle-filling machine.

3. Apparatus for supplying pasteurized beverage to a bottle-filling machine comprising a bulk pasteurizer for heating the beverage to a given pasteurizing temperature and having an input and an output, a pump connected to said input for feeding beverage from a supply to the pasteurizer at a constant rate irrespective of pressure, said rate being greater than the maximum rate of supply required by the bottle-filling machine, means at the output for feeding the pasteurized beverage to the bottle-filling machine at a required lower variable rate, a pipe connecting said output to the supply, and a check valve interposed in said pipe so as to permit flow from said output to said supply of only the remaining variable portion of beverage, the arrangement being such that the beverage flows at a constant rate through said pasteurizer independently of varying requirements of the bottle-filling machine.

4. Apparatus for supplying pasteurized beverage to a bottle-filling machine comprising a pressure chamber for storing the raw beverage and having an output, a bulk pasteurizer for heating the beverage to a given pasteurizing temperature and having an input and an output, a pump connected between said output of the pressure chamber and said input of the pasteurizer for supplying beverage to the pasteurizer, at a constant rate irrespective of pressure and greater than the maximum rate of supply required by the bottle-filling machine, means at the output for feeding the pasteurized beverage to the bottle-filling machine at a required variable lower rate, a pipe connecting said output of the pasteurizer to said output of the pressure chamber, and a check valve interposed in said pipe so as to permit flow from said output of the pasteurizer to said output of the pressure chamber only the remaining variable portion of the beverage, the arrangement being such that the beverage flows at a constant rate through said pasteurizer irrespective of varying requirements of the bottle-filling machine.

5. The method of bottling beverages directly from a bulk-pasteurizer which comprises, feeding the beverage from a supply source to the inlet of the pasteurizer at a constant rate, means for heating the beverage to a pasteurizing temperature, feeding a first portion of the beverage from the outlet of the pasteurizer at a required lower variable rate directly to the bottle-filling apparatus and simultaneously feeding a second portion of the beverage from the outlet of the pasteurizer at a rate equal to the difference between the constant rate and the required variable lower rate back to the supply source, thereby to maintain a constant rate of flow through the pasteurizer while filling bottles at a lower variable rate.

6. Apparatus for supplying pasteurized beverage to a bottle-filling apparatus comprising, a bulk-pasteurizer for heating the liquid therein to a predetermined pasteurizing temperature, means connected to the inlet of the pasteurizer for feeding beverage thereto from a supply at a constant rate, means connected to the outlet of the pasteurizer for feeding pasteurized beverage to the bottle-filling apparatus at a required lower variable rate, and further means connected to the outlet for simultaneously feeding beverage from the outlet to the supply at a rate which is the difference between the constant rate and the required lower variable rate whereby the beverage flows through the pasteurizer at a constant rate at all times.

References Cited in the file of this patent
UNITED STATES PATENTS

| | | |
|---|---|---|
| 2,236,087 | Detwiler | Mar. 25, 1941 |
| 2,239,397 | North et al. | Apr. 22, 1941 |
| 2,522,796 | Olson et al. | Sept. 19, 1950 |